UNITED STATES PATENT OFFICE.

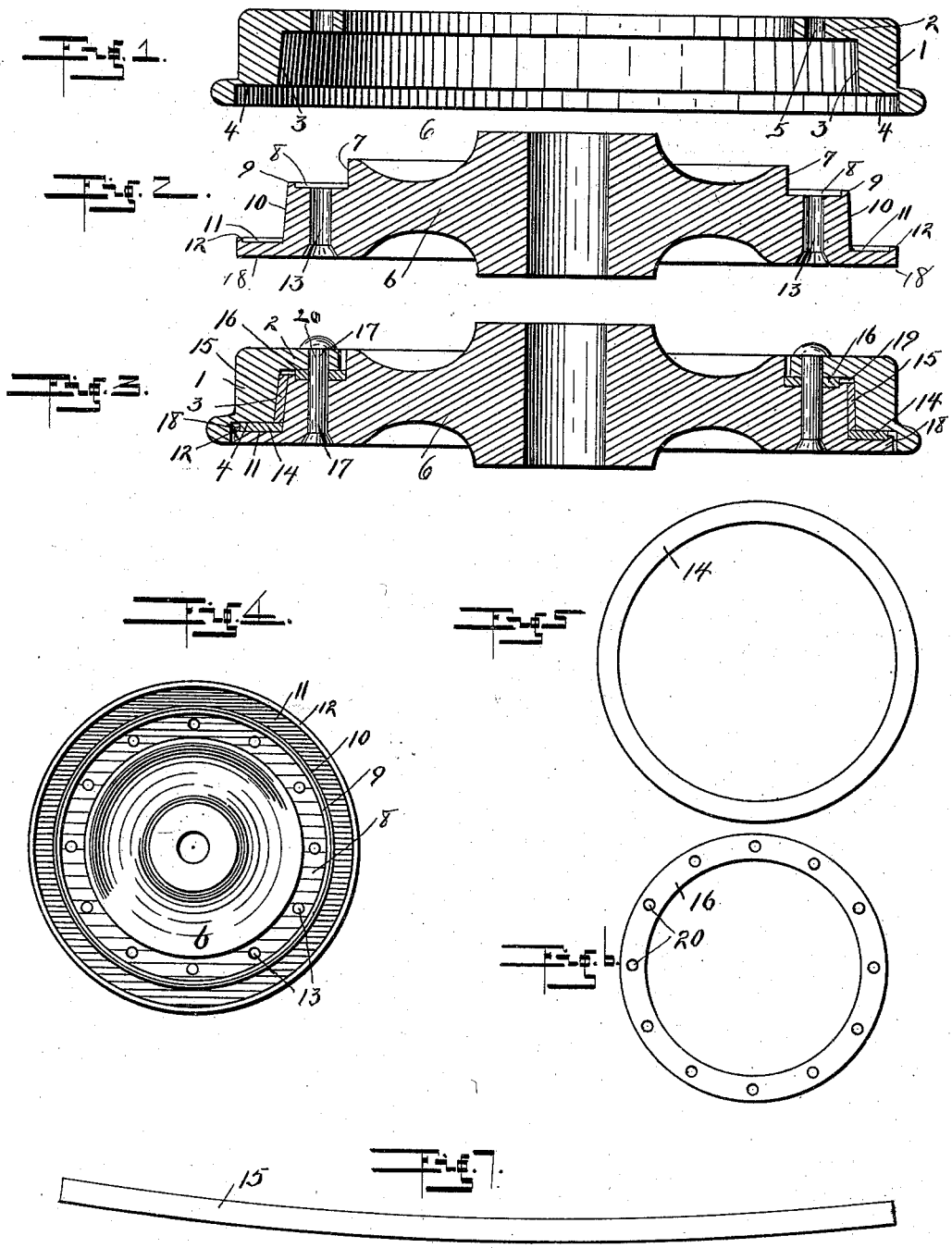

ISRAEL HOGELAND, OF CHICAGO, ILLINOIS.

NOISELESS CAR-WHEEL.

SPECIFICATION forming part of Letters Patent No. 643,134, dated February 13, 1900.

Application filed February 13, 1899. Serial No. 705,455. (No model.)

*To all whom it may concern:*

Be it known that I, ISRAEL HOGELAND, a citizen of the United States, residing at Chicago, in the county of Cook and State of Illinois, have invented a new Noiseless Car-Wheel, of which the following is a specification.

My invention relates to car-wheels for all classes of coaches, sleepers, poultry, postal, and stock cars, cabooses, and freight cars on steam-roads, as also cable, street, horse, and elevated-road cars.

The full nature of my invention will be understood by the accompanying drawings and the description and claims following.

In the drawings, Figure 1 is a central section through the tire alone. Fig. 2 is a central section through the body or center of the wheel without the tire. Fig. 3 is a central section through the wheel in its complete form. Fig. 4 is an elevation of the body or center of the wheel on the side to which the tire is secured, the tire being removed. Figs. 5, 6, and 7 are details of the cushions between the body or center and the tire.

In detail, 1 is the tire of a wheel, which is made separate from the body or center portion 6.

2 is an interior annular flange, and 3 is the interior surface of the main portion of the tire, and it is made inclined, as shown, so that the internal diameter of the tire at a point back against the annular flange 2 is less than the internal diameter at the outer edge of this main portion of the tire. The purpose of this will appear hereinafter.

4 is a recess within the exterior flange of the wheel, making the diameter of the wheel at that point greater than the diameter elsewhere, as is clearly shown in Fig. 1.

5 shows a series of bolt-holes in the interior annular flange 2.

The tire is made out of gray iron, and its face is chilled. The body or center of the wheel is made out of gray iron. It is observed, therefore, that when the tire is worn a new chilled or hardened tire can be put in its place.

Turning now to the body or center of the wheel 6, an annular recess is provided in which the interior annular flange 3 of the wheel is adapted to fit. The interior surface of said recess forms a shoulder 7, and along the exterior edge of said recess a rib 9 is located, forming a seat 8 therein for the cushion 16, as appears in Fig. 3. This depression or seat holds the cushion-ring 16 tightly in place and prevents it from spreading out under the extreme pressure to which it is subjected. Said cushion-ring 16 is made, preferably, of paper. It is perforated with the holes 20 for the passage of the rivets 17. The body or center of the wheel is provided with the rivet-holes 13, through which said rivets 17 extend. In this manner the tire is held on the body or center of the wheel.

The peripheral face 10 of the body or center of the wheel is made slightly tapering to permit the passage over it of the internal surface 3 of the tire. The tapering form of these two engaging surfaces is so made as to permit the easy placing of the tire on the body or center of the wheel. The dimensions are preferably such that the tire will go readily on the center or body of the wheel within one-half inch of the limit in the full-sized wheel, and then it is subjected to pressure to force it into final position. This flaring form of the tire and tapering form of the center of the wheel is important also in view of the cushion 15, which surrounds the peripheral center 10 of the body or center of the tire. The tire can easily be placed over said cushion-ring without tearing it up or disturbing it or injuring it in any way. Said ring 15 is preferably made of paper, leather, or asbestos. The latter material is valuable in such position where the wheels are to be used on rough roads and are liable to overheating, where the roads have long grades to prevent the heat imparted by the brake-shoe to the tire being transmitted to the body or center of the wheel.

Along the outer edge of the body or center of the wheel a radially-extending annular flange 18 is provided that fits in the recess 4 in the tire. Said flange has on it a rib 12 to form in the inner face of said flange 18 a depression 11 to form a seat for the cushion-ring 14. Said ring is preferably of the same material and character as the cushion-ring 16. The cushions 14 and 16 should be thick enough to prevent the outer edges of the ribs 9 and 12 from coming in positive contact with the tire. It is observed that the cushion 15 must be cut somewhat in a curved form, as shown in Fig. 7, in order to fit properly on the tapered surface 10 of the body or center of the wheel.

From the foregoing description it will be plain that I have invented a noiseless car-wheel of very simple yet very strong and efficient construction, and it is so formed with a separable tire that when said tire is worn a new tire can be put in its place and the wheel be as strong as when it was first made. When the parts are being riveted together, the tire is pressed on or against the body or center of the wheel under many tons of pressure, so that when the rivets are all in place the wheel is substantially as solid and compact as if it were integral. Said parts may also be drawn together without a press by means of bolts extending through the bolt-holes 5 and 13, and after the bolts are drawn tight with a wrench they can be singly removed and the rivets inserted in their places one at a time. This may be done in any ordinary blacksmith or car shop.

The outside cushions 14 and 16 are preferably of material and arranged as shown, so that they will protect the main cushion 15 from moisture.

What I claim as my invention, and desire to secure by Letters Patent, is—

1. A car-wheel comprising a body or center portion, a tire, means for securing the two parts together, and cushions between the parts, the engaging surface of one of the parts having a depression formed by an outer rib, and the cushion being thick enough to extend beyond the rib that forms the depression.

2. A car-wheel comprising a body or center portion with recesses forming the peripheral annular surface into three sections with two radial surfaces between them, said radial surfaces having depressions in them, three cushions to fit on the central section of the peripheral surface and on the said two radial surfaces, respectively, a tire formed to fit on the peripheral surfaces of the body or center portion, and means for securing these parts together.

3. A car-wheel comprising a body or center portion with the peripheral surfaces 7 and 10 and the flange 18 and the radial surfaces provided with the ribs 9 and 12 forming depressions 8 and 11 therein, the surface 10 being tapered as shown, cushions 14 and 16 fitting in the depressions 8 and 11, the cushion 15 on the surface 10, a tire with the internal flange 2, the inner tapering surface 3 and recess 4 to fit snugly on the body or center portion of the wheel, said two portions of the wheel having the bolt-holes 5 and 13, and rivets or bolts for securing said parts together.

4. A car-wheel comprising a body or center portion, a tire, means for securing them together, a main cushion 15 between the parts and a cushion on each side of the main cushion and clamped between radial faces on the tire and body, respectively and protecting the main cushion from moisture.

ISRAEL HOGELAND.

Witnesses:
HARRY HOGELAND,
THOMAS NESOM.